United States Patent [19]
Hale

[11] 3,843,163
[45] Oct. 22, 1974

[54] ADJUSTABLE TRAILER HITCH
[76] Inventor: William B. Hale, 1203 Box Elder St., Casper, Wyo. 82601
[22] Filed: Feb. 5, 1973
[21] Appl. No.: 327,754

[52] U.S. Cl. ..... 280/490 R, 280/405 R, 280/478 R, 280/482
[51] Int. Cl. ............................................. B60d 1/06
[58] Field of Search ............ 280/490 R, 405 R, 478

[56] References Cited
UNITED STATES PATENTS
2,523,211  9/1950  Hedgpeth ........................ 280/405 R
3,235,284  2/1966  Yant ........................ 280/490 R X

*Primary Examiner*—Leo Friaglia
*Attorney, Agent, or Firm*—David H. Hill

[57] ABSTRACT

Adjustable means are provided in a trailer hitch whereby the towed vehicle may remain level as the hitch is connected to drawbars of differing heights.

5 Claims, 3 Drawing Figures

PATENTED OCT 22 1974 3,843,163

ADJUSTABLE TRAILER HITCH

This invention pertains generally to trailer hitches, and more particularly to trailer hitches of adjustable height.

The number of towed vehicles on the roads has increased sharply in recent years, partly as a result of the increased popularity of recreational vehicles such as campers and the like, and partly due to the increased use of rental trailers. As this use of various kinds of trailers expands, the need for a reliable trailer hitch of simple configuration becomes more urgent.

The prior art includes many different types of trailer hitches, each designed to meet one or more needs in use. One such need is the desirability of maintaining the towed vehicle in a level or horizontal position, irrespective of the height of the particular drawbar or towing hitch to which it is connected. Not only is the load more evenly distributed in a level tailer, but the performance of the trailer as a road vehicle is thereby enhanced, since the suspension is generally designed for maximum performance at a horizontal attitude. More specifically, the caster and camber of the wheels of the towed vehicle will be true only when the frame thereof is level with the road.

Adjustable-height trailer hitches have been provided in the past, but these prior art designs have proven unnecessarily complicated and cumbersome. This is especially true in view of the larger number of persons of little mechanical skill who use trailers today; the average driver cannot be expected to be an expert at mechanical devices such as trailer hitches. Furthermore, many drivers who may wish to use trailers are not possessed of the strength required to manipulate the adjustableheight trailers of the prior art. In addition, the structures of most prior art adjustable hitches are sufficiently complicated to render the devices unnecessarily expensive.

Accordingly, it is a primary object of the present invention to provide a simple and inexpensive trailer hitch of adjustable height to accommodate a level towed vehicle to drawbars of differing heights.

In accordance with the present invention, this and other objects are achieved by means of an adjustable hitch apparatus for a towed vehicle having a normally horizontal main frame and a follower hitch coupling forwardly positioned thereon, the adjustable hitch apparatus including an auxiliary frame means attached to the normally horizontal main frame rearwardly of the follower hitch coupling for pivotal movement relative to the main frame about a horizontal axis. Follower hitch means are included on the auxiliary frame means for cooperative engagement with a complementary towing hitch coupling on a towing vehicle, and towing hitch means are mounted on the auxiliary frame means intermediate the follower hitch means and the aforementioned horizontal axis for cooperative engagement with the follower hitch coupling. Means are provided on the auxiliary frame for selectively varying the distance between the auxiliary frame means and the towing hitch means mounted thereon.

With the above considerations and objects in mind, the invention itself will now be described in connection with a preferred embodiment thereof, given by way of example and not of limitation, and with reference to the accompanying drawings, in which.

Figure 1:
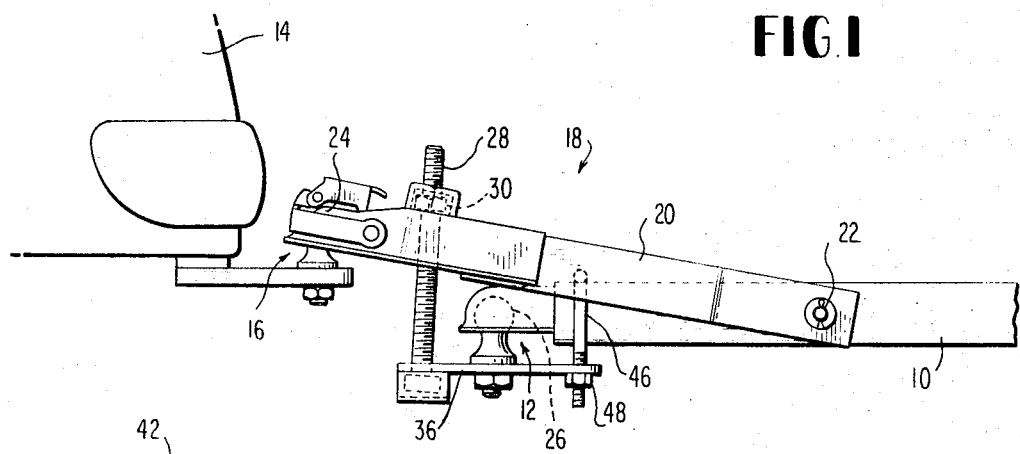
FIG. 1 is a side elevation view of the apparatus of the present invention in use.

Referring now particularly to FIG. 1, the normally horizontal main frame of a trailer or towed vehicle is indicated at 10, this main frame having a follower hitch coupling 12 forwardly positioned thereon. A towing vehicle 14 has a towing hitch coupling 16 mounted thereon, and in the absence of the apparatus of the present invention, the follower hitch coupling 12 would normally engage the towing hitch coupling 16, the former having the usual spherical recess to receive in complementary fashion the ball of the latter. Throughout the description of the present invention, the hitch coupling members which are of the type which normally provide the towing force will be referred to as a towing hitch member, and the cooperating sockets or the like which engage such towing hitch members will be referred to as a follower hitch member, irrespective of whether the one or the other actually provides or receives, respectively, a towing force.

In the absence of the apparatus of the present invention, the follower hitch coupling 12 of the trailer main frame 10 would normally receive and cooperatively engage the ball of the towing hitch coupling 16, but as may be seen in FIG. 1, where the towing hitch is at a greater distance from the road than is the follower hitch coupling 12 when the main trailer frame 10 is in its desired level condition, the frame 10 must be tilted in a clockwise direction (as seen in FIG. 1) in order to effect the engagement of members 12 and 16, resulting in an undesirable non-level attitude of main trailer frame 10.

In order to accommodate trailer frame 10 to the relatively high towing hitch coupling 16, the apparatus of the present invention, indicated generally at 18 in FIG. 1, is employed. This adjustable hitch apparatus 18 of the present invention includes an auxiliary frame means 20 attached to the normally horizontal main frame 10 of the trailer at a pivotal connection 22 which is positioned rearwardly of the follower hitch coupling 12 whereby the auxiliary frame 20 is free of pivotal movement relative to the main trailer frame 10 about a horizontal axis extending through the point 22 of pivotal attachment.

The auxiliary frame 20 of the adjustable hitch apparatus 18 of the present invention includes at its forward end a follower hitch means 24 which cooperatively engages the complementary towing hitch coupling 16 on the towing vehicle 14.

An auxiliary towing hitch means 26 is mounted on the auxiliary frame 20 by means of a threaded rod 28 or the like which is threadedly engaged with the auxiliary frame 20 as by means of a threaded nut 30 held captive in a housing on the auxiliary frame. An arm 32 having a handle 34 thereon is secured to the threaded member 28, whereby the latter may be rotated relative to nut 30 and frame member 20 to advance the threaded member 28 in one direction or another linearly through the nut 30, depending upon the direction of rotation of the handle 34. The arm 36 of the towing hitch means 26 is secured to the threaded member 28 in any suitable manner which permits rotation of the threaded member 28 relative to the arm 36, as well as some slight relative pivotal movement between the two, such as by means of a head on the threaded member 28 held captive by but freely rotatable with respect to the arm 36.

Figure 2:
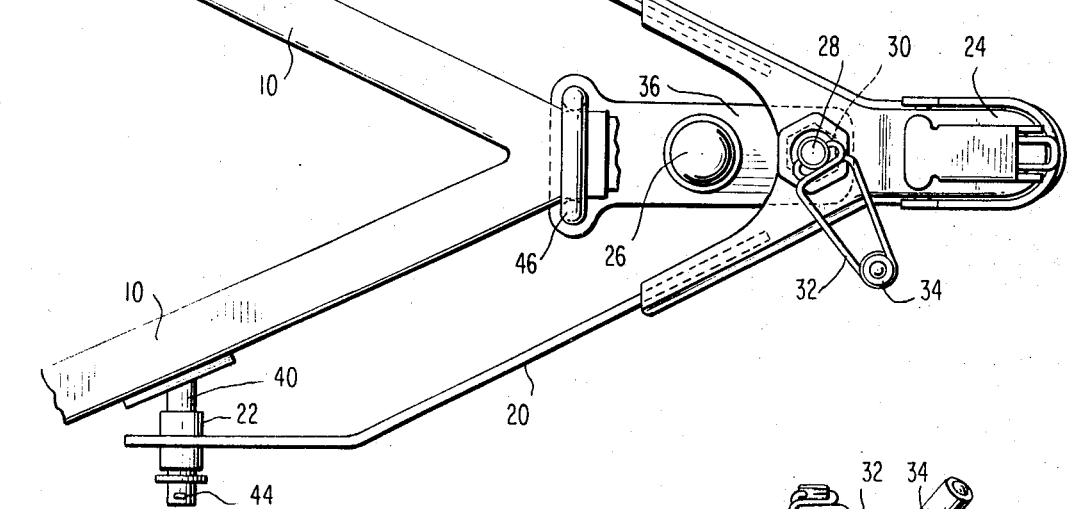
FIG. 2 is a plan view of the apparatus of the present invention.
Figure 3:
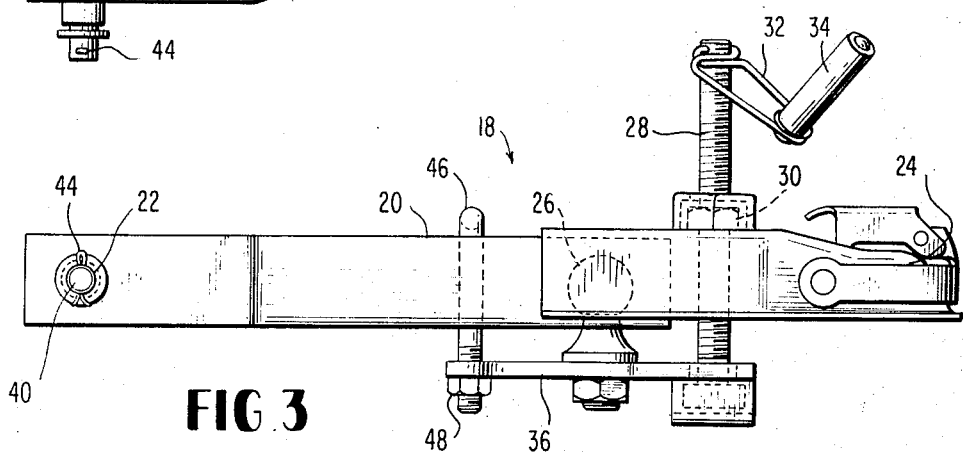
FIG. 3 is a side elevation veiw of the apparatus of the present invention with the height-adjusting means in its stored position.

FIGS. 2 and 3 show the adjustable hitch apparatus 18 of the present invention in somewhat greater detail, with the reference numerals utilized in these two figures corresponding to those employed in the description of FIG. 1. FIG. 2 in particular shows the manner of pivotally connecting the auxiliary frame member 20 to the main frame member 10 of a towed vehicle, this pivotal connection being indicated generally in FIG. 1 at 22. As is seen in FIG. 2, the two arms of the main frame 10 of the towed vehicle are generally positioned at an acute angle, forming the tongue of the trailer frame, and the adjustable trailer hitch 18 of the present invention includes two adapter members 38 and 40 having appropriately angled flanges thereon for connecting in any suitable manner to the trailer frame 10, these adapter members 38 and 40 being pivotally received within suitable sleeves (indicated at 22 in FIG. 2) mounted on the auxiliary frame 20. Cotter pins 42 and 44 or the like may be employed to retain the adapter members 38 and 40 within these sleeves.

In describing the operation of the adjustable trailer hitch apparatus of the present invention, the relative position of the movable members of the apparatus as shown in FIG. 3 may be considered to be the normal position thereof. In this position of the several members of the apparatus, a trailer frame may quite easily be connected to a drawbar of substantially the same height. In fact, with the several members in the relative positions shown in FIG. 3, the auxiliary towing hitch means 26 is slightly higher than the follower hitch means 24, resulting in a capability of the apparatus of the present invention for adapting a level trailer frame to a drawbar lower than the trailer frame. As is often the case, however, the drawbar to which the trailer is to be connected is at a greater distance from the raod than is the level trailer frame, and an appropriate rotation of the screw threaded member 28 relative to the screw threaded nut 30 on auxiliary frame 20 will advance the former through the latter linearly in a downward direction to bring the auxiliary towing hitch means 26 to a position lower than the follower hitch means 24. In other words, this rotational movement of the screw threaded member 28, while maintaining the auxiliary towing hitch means 26 stationary at a level with the height of the main trailer frame 10 results in a raising of the auxiliary follower hitch means 24 to a height corresponding to the main towing hitch coupling 16 on the towing vehicle 14.

It will be understood by those familiar with this art that irrespective of the angular adjustment of the auxiliary frame member 20 as thus described, the main pulling force between the towing vehicle 14 and the towed frame 10 is transmitted through the towing hitch coupling 16, the auxiliary follower hitch means 24, the auxiliary frame means 20 and the pivotal connection means 22 to the towed frame member 10. The towing force is not primarily transmitted through the screw threaded member 28 and the auxiliary towing hitch means 26 which engages the follower hitch coupling 12 of the main frame member 10; this connection through screw threaded member 28 is primarily utilized for the necessary height adjustment, rather than for transmitting the towing force.

As is apparent from the several figures of the drawings herein, the threaded nut 30 is mounted in a housing fixed on auxiliary frame 20 in a non-fixed but captive manner by any of several well-known suitable devices, whereby the nut 30 is restrained against rotation relative to the housing about the axis of the threaded member 28 but relative pivotal movement of the auxiliary frame 20 about the pivotal cnnection 22 is permitted. By this type of mounting of nut 30 on frame 20, rotation of threaded member 28 within the relatively stationary (for rotation) nut results in the travel of the former through the latter, as previously described. As a result of such travel, however, a pivotal reorientation of threaded member 28 takes place with respect to the frame 20. As just stated, nut 30 is "free" for this slight pivotal movement, and, further, the threaded inner bore of nut 30 may, if desired, be at an appropriate acute angle with respect to the flat top surface of the nut, rather than in the usual orthogonal relationship. Similarly, and as previously indicated, the interconnection of arm 36 and threaded member 28 permits some degreee of relative pivotal movement. Thus, as the height adjustment is made from one to another end of the permissible travel, the relative position of threaded member 28 with respect to both the frame 20 and the arm 36 is subject to change to accommodate the change in the geometrical configuration of the several parts.

One member not previously described is the clamp member 46 of inverted U shape. As shown in the drawings, this clamp 46 which may take the form of a U-bolt secured to arm 36 by nuts 48, lies over and around the forward tongue portion of towed frame member 10, preventing substantial tipping of the arm 36.

The invention has been described above in some detail, and particularly with reference to the use of ball and socket types of couplings. However, it will be obvious that the invention is equally applicable to other types of trailer hitch couplings as are well known in the art. The invention is thus not to be considered as being limited to the particular details given, nor to the specific application to which reference has been made during the description of the preferred embodiment of the invention, but should be considered as extending to encompass all such revisions and modifications as would be obvious to a workman of ordinary skill in the art.

What is claimed is:

1. A selectively adjustable hitch apparatus for a towed vehicle having a normally horizontal main frame and a follower hitch coupling forwardly positioned thereon, comprising auxiliary frame means attached to such normally horizontal main frame rearwardly of such follower hitch coupling for pivotal movement relative to such main frame about a horizontal axis, follower hitch means on said auxiliary frame means for cooperative engagement with a complementary towing hitch coupling on a towing vehicle, towing hitch means for cooperative engagement with such follower hitch coupling on such towed vehicle, vertically adjustable means for mounting said towing hitch means at a selectable relatively fixed position below said auxiliary frame means intermediate the length thereof, and retaining means on said auxiliary frame means engaging said adjustable mounting means for retaining said mounting means in a selected vertical position relative to said auxiliary frame means, whereby the vertical adjustment of said adjustable mounting means effects pivotal movement of said auxiliary frame means in a vertical plane to a selected position which will permit the main frame of such towed vehicle to remain horizontal irrespective of the height of the hitch means of a towing vehicle.

2. An adjustable hitch apparatus in accordance with claim 1, wherein such horizontal axis is coincident with the point of pivotal attachement of said auxiliary frame means on such main frame.

3. An adjustable hitch apparatus in accordance with claim 1, wherein said follower hitch means on said auxiliary frame is a socket coupling member for cooperative engagement with a complementary ball towing hitch member.

4. An adjustable hitch apparatus in accordance with claim 1, wherein said towing hitch means on said auxiliary frame is a ball coupling member for cooperative engagement with a complementary socket follower hitch member.

5. An adjustable hitch apparatus in accordance with claim 1, wherein said vertically adjustable means for mounting said towing hitch means at a selectable relatively fixed position below said auxiliary frame means includes a threaded member supporting said towing hitch means and threadedly engaged with a cooperating threaded member on said auxiliary frame.

* * * * *